(12) United States Patent
Haegermarck

(10) Patent No.: US 8,032,978 B2
(45) Date of Patent: Oct. 11, 2011

(54) ROBOTIC CLEANING DEVICE

(75) Inventor: Anders Haegermarck, Trångsund (SE)

(73) Assignee: AB Electrolux, Stockholm (SE)

( * ) Notice: Subject to any disclaimer, the term of this patent is extended or adjusted under 35 U.S.C. 154(b) by 524 days.

(21) Appl. No.: 11/995,071

(22) PCT Filed: Jul. 6, 2006

(86) PCT No.: PCT/SE2006/000847
§ 371 (c)(1),
(2), (4) Date: Jun. 18, 2008

(87) PCT Pub. No.: WO2007/008148
PCT Pub. Date: Jan. 18, 2007

(65) Prior Publication Data
US 2009/0126143 A1    May 21, 2009

(30) Foreign Application Priority Data

Jul. 8, 2005    (SE) ...................................... 0501613

(51) Int. Cl.
*A47L 5/00* (2006.01)
(52) U.S. Cl. .......................................................... 15/319
(58) Field of Classification Search ..................... 15/319
See application file for complete search history.

(56) References Cited

U.S. PATENT DOCUMENTS

| | | | |
|---|---|---|---|
| 5,023,444 A | 6/1991 | Ohman | |
| 5,095,577 A * | 3/1992 | Jonas et al. | ...................... 15/315 |
| 5,369,347 A | 11/1994 | Yoo | |
| 5,682,313 A | 10/1997 | Edlund et al. | |
| 5,841,259 A | 11/1998 | Kim et al. | |
| 5,867,800 A | 2/1999 | Leif | |
| 5,935,179 A | 8/1999 | Kleiner et al. | |
| 5,940,927 A | 8/1999 | Haegermarck et al. | |
| 6,226,830 B1 | 5/2001 | Hendriks et al. | |
| 6,300,737 B1 | 10/2001 | Bergvall et al. | |
| 6,465,982 B1 | 10/2002 | Bergvall et al. | |
| 7,474,941 B2 | 1/2009 | Kim et al. | |
| 2004/0020000 A1 | 2/2004 | Jones | |
| 2004/0111184 A1* | 6/2004 | Chiappetta et al. | ........... 700/245 |
| 2006/0200281 A1* | 9/2006 | Ziegler et al. | .................... 701/23 |
| 2007/0016328 A1* | 1/2007 | Ziegler et al. | ................. 700/245 |

FOREIGN PATENT DOCUMENTS

| | | |
|---|---|---|
| EP | 0 474 542 | 3/1992 |
| EP | 474542 A2 * | 3/1992 |
| EP | 1 441 271 | 7/2004 |
| EP | 1441271 A2 * | 7/2004 |

* cited by examiner

*Primary Examiner* — Bryan R Muller
(74) *Attorney, Agent, or Firm* — Hunton & Williams (57) ABSTRACT

A robotic cleaning device having a main body with a controllable drive device to move the device over a surface, a cleaning device to clean the surface, an obstacle detecting device, and a control device connected to the drive device and the obstacle detecting device. The main body has a left wall connecting a front end portion with a left rear end portion and a right wall connecting the front end portion with a right rear end portion. The control device receives information from the obstacle detecting device about a detected obstacle and controls the drive device to rotate the device around a main left-turn axis at the left rear end portion or a main right-turn axis at the right rear end portion, such that the device turns one around one of the axes. The side walls are configured such that the device clears the obstacle by the turning motion.

15 Claims, 5 Drawing Sheets

ROBOTIC CLEANING DEVICE

PRIORITY CLAIMS

The present invention claims the benefit of Swedish Application No. 0501613-4 filed Jul. 8, 2005, and International Application PCT/SE2006/000847, filed Jul. 6, 2006 and published as International Publication No. WO 2007/008148 on Jan. 18, 2007. The foregoing references are incorporated herein in their entireties.

TECHNICAL FIELD OF THE INVENTION

The present invention relates to a robotic cleaning device, for example a robotic vacuum cleaner.

BACKGROUND ART

Robotic cleaning devices, such as robotic vacuum cleaners, are known in the state of the art. One such robotic cleaning device is disclosed in U.S. Pat. No. 5,369,347, which reference is incorporated herein. This known device comprises a housing having an overall shape of a circular block. For driving the device, the device is provided with one driving wheel and two support wheels, which support wheels are arranged at diametrical opposite sides of the device. For steering the device, the driving wheel is pivoted around a vertical axis.

Such a known device can be operated in the following manner. When the device moves forwards, the driving wheel is oriented in parallel with the support wheels. If, for example, the device hits an obstacle on the left side thereof, the driving wheel is pivoted 90° to the right, whereby the device is brought to a complete halt before it will start to rotate. The rotation will be to the right and, because the support wheels are arranged on a diameter of the circular device, around a central axis between the support wheels. Furthermore, due to the round shape of the device, the obstacle will not obstruct the rotation of the device. When the device has turned 90°, the driving wheel is pivoted 90° to the left it will again be parallel with the support wheels. The device will start to move forward and is allowed to travel a small distance. Then, the driving wheel is pivoted 90° to the left, wherein the device again is caused to stop before it starts to turn left around the central axis.

After the device has turned 90° left, the driving wheel is pivoted back to being parallel with the support wheels and the device will again travel forward in the original direction. A problem with this known robotic cleaning device is that it is time and energy consuming to steer the device around obstacles, for example table legs or chair legs, which are common in normal home environments. This is especially a problem with battery operated robotic cleaning devices, since the batteries thereof often have to be reloaded or recharged, which extends the cleaning time even more.

It is of course also possible to rotate the driving wheel less then 90° when the device hits an obstacle. However, since the device in that case will not turn around a central axis, a problem with this way of operation is that the device will not move clear of the obstacle, but will be pushed backwards by the obstacle during the rotation or will even get stuck.

SUMMARY OF THE INVENTION

It is therefore an object of the present invention to provide a robotic cleaning device that reduces or alleviates the above-mentioned problems. This object may be achieved by a robotic cleaning device according to claim 1.

An exemplary embodiment of a robotic cleaning device according to the invention comprises a main body, which accommodates controllable drive means arranged to move the device over a surface, cleaning means arranged to clean a surface when the device is moved over a surface, obstacle detecting means, and control means connected to the drive means and the obstacle detecting means. The main body has a left side wall connecting a front end portion with a left rear end portion and a right side wall connecting the front end portion with a right rear end portion. The control means, when receiving information from the obstacle detecting means about a detected obstacle, is arranged to control the drive means to rotate the device around one of a main left-turn axis located at the left rear end portion and a main right-turn axis located at the right rear end portion, such that the device performs substantially only turning motion around the one of said axes. The left side wall and the right side wall are configured such that the device is moved clear of the detected obstacle by said turning motion.

Due to the cleaning device being arranged to rotate around one of two main turn axis in the rear portion of the device in combination with the side walls being configured in coordination with said rotation axis, the cleaning device is able to move clear from an obstacle without having to stop. In addition, this combination of turning axis locations and side wall configuration makes it possible to move the device clear of most obstacles by a turn less than 90°.

In a normally furnished room in an average home, a cleaning robot will hit an obstacle about 20-60 times per minute. Because the cleaning device according to the invention can be operated with fewer decelerations and accelerations, and often can avoid obstacles with turns extending over a smaller angle than the prior art device, the cleaning device according to the invention can maintain a higher speed average when operated in a normal home. Furthermore, this higher speed average can be achieved with the same or less energy consumption as compared to the prior art device. It is thus possible to use the same or even smaller, fewer, and/or less heavy-duty batteries in the device according to the invention than in the prior art device. Consequently, the robotic cleaning device according to the invention may be able to clean a room faster while consuming the same or less energy compared to the prior art device.

The invention relates to robotic cleaning devices, or in other words, to automatic, self-propelled machines for cleaning a surface. The robotic cleaning device according to the invention can be operated from a wall outlet by a cord, be battery-operated, or use any other kind of suitable energy source, for example solar energy.

In this application, expressions like "left," "right," "front," and "rear" are related to the normal traveling direction of the robotic cleaning device when in use.

According to one embodiment of the invention, the robotic cleaning device may have a cleaning means which is arranged to clean a surface when the robotic cleaning device is moved over a surface, wherein the surface traveled by the cleaning device not necessarily needs to be identical with the cleaned surface. The cleaning means can for example include vacuum means, swabbing means or polishing means. If the cleaning means are vacuum means, the robotic cleaning device according to the invention can be called a robotic vacuum cleaner. The cleaning device according to the invention is intended to be used on a mainly horizontal surface such as a floor, but the surface to be cleaned could also be an outdoor surface, for example a patio floor.

The robotic cleaning device according to the invention may include a controllable drive means. The drive means includes means for propelling the cleaning device, for example an electric motor, and means for carrying the cleaning device, for example gliding means or wheels.

The robotic cleaning device according to the invention may include an obstacle detecting means for example a bumper connected to sensors, IR-means, and/or sonar means, a microwave radar, a camera registering its surroundings, a laser scanner, etc., for detecting obstacles and communicating information abut any detected obstacle to a control means.

Furthermore, the robotic cleaning device according to the invention may include a control means, for example a microprocessor. The control means may be connected to the obstacle detecting means and to the drive means such that said control means is able to receive information about an obstacle detected by the detection means and to control the drive means in response to the received information. According to one embodiment of the invention, the control means is able to process the information from the obstacle detecting means.

According to one exemplary embodiment of the invention, these components of the robotic cleaning device, i.e. the controllable drive means, the cleaning means, the obstacle detecting means and the control means, are accommodated in a main body of the cleaning device. The main body can be a block shaped housing having a rather low height in relation to the lateral extension thereof such that it will fit in under pieces of furniture having short legs, for example beds and sofas. The components can be completely enclosed in the main body or protrude therefrom, wherein it is advantageous if any protruding components do not obstruct the cleaning device when driving in under furniture. The main body has a front end portion, a left rear end portion and a right rear end portion. A left side wall extends between the front end portion and the left rear end portion, a right side wall extends between the front end portion and the right rear end portion along respective sides of the main body. When the cleaning device is placed on a surface to be cleaned, the side walls are oriented such that any encountered obstacles in most cases will struck the side walls of the main body of the cleaning device unless the cleaning device is turned away in time.

An obstacle can be any hindrance in a normally furnished room, for example a wall, a table leg or a chair leg.

When an obstacle is detected, the control means may be arranged to control the drive means such that the cleaning device rotates around a main left-turn axis or a main right-turn axis in an obstacle avoiding operation. The control means can of course control the drive means to steer the cleaning device around the other axis or in a straight direction during other operations, for example during cleaning of areas with no obstacles. The main left-turn axis is located at the left rear end portion and the main right-turn axis is located at the right rear end portion. According to one embodiment of the invention, the respective main turn axes are located substantially on the periphery of the main body at respective rear end portions. According to the invention, the cleaning device can also be arranged to turn around main turn axes located outside of the main body at the respective end portion.

According to an exemplary embodiment of the invention, the side walls of the main body may configured such that the cleaning device is moved clear from a detected obstacle when brought to rotate around one of said main turn axes. According to this embodiment, due to the location of the main turn axis and the corresponding shape of the side walls, the cleaning device is moved clear from the detected obstacle by the turning motion only. In other words, the cleaning device performs substantially only rotation and no translation during the obstacle avoiding turn. The cleaning device thus performs a "clean" turn without being forced to slide backwards by the obstacle.

According to the invention, the cleaning device is moved clear from an obstacle when it is free to move unaffected by the obstacle in any forward direction.

According to another exemplary embodiment of the invention, the side walls can have such a shape that the side wall on the side where an obstacle is detected slides along the detected obstacle when the cleaning device turns around the corresponding one of the main turn axes. Alternatively, the side walls can have such a shape that the distance to the detected obstacle increases as the cleaning device turns. Another alternative according to the invention is to provide the side walls with flexible parts or flexible mounted parts. When the cleaning device hits an obstacle with one side wall and starts to turn around the corresponding one of the main turn axes, the side wall can flex when pushed against the obstacle by the turning motion such that the cleaning device is moved clear without having to translate.

According to another exemplary embodiment of the invention, the side walls may be essentially equal length and form a vertex between them at the front end portion. The main body can have a rounded front end such that the actual vertex is outside of the boundaries of the main body, i.e. in front of the main body. An advantage with this embodiment it is that the detecting means more easily can detect if an obstacle is located on the left or the right side in relation to the cleaning device. Thereby, the control means can be arranged to control the drive means to rotate the cleaning device around the main left-turn axis or the main right-turn axis in response to on which side of the cleaning device the obstacle is detected such that the cleaning device will move clear from a detected obstacle in the most suitable and fastest way.

Another advantage is that the shape of the main body is symmetric over a longitudinal axis such that the cleaning device can be arrange to move in a symmetrical way when turning left and right.

According to one exemplary embodiment of the invention, the side walls are convex.

According to another exemplary embodiment of the invention, at least a major portion of the left side wall is shaped as a circular arc having a centre of curvature that coincides with the main right turn axis, and a major portion of the right side wall is shaped as a circular arc having a centre of curvature that coincides with the main left turn axis. Consequently, when the cleaning device is turned around one of the main turn axis, the distance between the obstacle and the nearest point of said major wall portion will be constant as the cleaning device turns. Thus, the shape of side wall and the location of the corresponding main turn axis ensures that the cleaning device will not get stuck on the obstacle and that the cleaning device is able to move clear from the obstacle by the turning motion only and without any translational sliding. Furthermore, this shape of the side walls provides a main body with a maximal extended outline, such that, between the side walls, as much space as possible for the components of the cleaning device is obtained. If the outline of the side walls is extended beyond said circular arcs, the cleaning device is not able to move clear from an obstacle by a clean turn unless the side walls can flex. According to one embodiment, the side walls follow the curve of said arcs along substantial all the length thereof.

According to another exemplary embodiment of the invention, the main body has a general overall shape of a triangular block, preferably an equilateral triangular block. Thereby the cleaning device will be able to turn around in a narrow corridor without getting stuck with the rear wall. If the robotic cleaning device is a robotic vacuum cleaner, this shape of the triangular main body provides space for a suction slit extending from the left rear end portion to the right rear end portion over substantially the whole breadth of the main body. Thereby, the robotic vacuum cleaner advantageously cleans a stripe as wide as possible in each go over a surface to be cleaned, which also will contribute to minimize the time needed to clean a room.

Since, according to embodiments of the invention, the main left-turn axis and the main right-turn axis are not central axes, the cleaning device will be able to move clear of a narrow obstacle, for example a leg of a piece of furniture, by a turn less than 90°. If the main body has an equilateral outline and the main turn axes are located in the rear corners, the cleaning device will be able to move clear by a 60° turn if the obstacle is detected straight ahead of the cleaning device. If the obstacle is detected to one side of the cleaning device, the cleaning device will be able to move clear by a turn over an even smaller angle. Consequently, the cleaning device according to the invention will be able to maintain a high speed average by performing turns over a smaller angle.

According to one embodiment of the invention, the drive means includes a steerable drive wheel. According to another exemplary embodiment of the invention, the drive means has only one such drive wheel. In order to steer and rotate the cleaning device, the control means is arranged to pivot the drive wheel. Thus, the drive wheel is rotatable arranged around a horizontal axle for driving the cleaning device, and pivotably arranged around a vertical axle for changing the direction of the horizontal rotation axle.

The drive wheel can be arranged to pivot 180° in each direction, whereby the cleaning device can be reversed.

According to one embodiment of the invention, the steerable drive wheel is mounted in front of an axis between the main left-turn axis and the main right-turn axis. According to one embodiment of the invention, the steerable drive wheel is located at the front end portion. A front position of the steerable drive wheel will advantageously increase the nimble and responsive way of movement of the cleaning device.

According to one embodiment of the invention, several heavy components of the clearing device are located in the front half of the cleaning device. For example, in a cleaning device in the form of a robotic vacuum cleaner, the suction fan, the battery pack and the drive and steering motors located in the front half of the cleaning device, close to the steerable drive wheel in the front end portion. Through this arrangement, a major portion of the weight is carried by the drive wheel, such that the cleaning device obtains favorable climbing capabilities, whereby the cleaning device can get over a doorstep or the like. Consequently, in this embodiment the centre of gravity is close to the drive wheel, which is advantageous when accelerating and breaking. According to embodiment of the invention, more than 80%, of the weight of the device is carried by the steering wheel.

According to one embodiment of the invention, the centre of gravity is located at a distance form each of the main left-turn axis and the main right-turn axis. Thereby, the cleaning device will experience a turning momentum when turning around one of the main turn axes due to momentum forces. This turning momentum will contribute to the low energy consumption of the cleaning device. If the distance between the centre of gravity to the respective main turning axis is equal, the experienced momentum will be equal during left and right turns around the corresponding main turn axis.

According to one embodiment of the invention, the drive means includes support means. The support means have low friction in a main forward driving direction and high friction in both directions of an axis perpendicular to the a main forward driving direction. Thereby the support means defines all possible locations of "clean" turning axes of the cleaning device, i.e. axes for performing only turning motion without sliding or translating, to that perpendicular axis. The support means can include one or several non-pivotable support means, but can also constitute a glide rail arranged in a rear portion of the cleaning device perpendicular to the main forward driving direction.

BRIEF DESCRIPTION OF THE DRAWINGS

The invention may be performed in many various ways, and by way of example only, an embodiment thereof will now be described in detail with reference being made to the accompanying drawings, in which.

DETAILED DESCRIPTION OF PREFERRED EMBODIMENTS OF THE INVENTION

In FIGS. 1-4, an exemplary embodiment of the invention in the form of a robotic vacuum cleaner is shown. The vacuum cleaner comprises a main body 1 in the from of a housing. The main body has a general overall shape of an equilateral triangular block having a front end portion 3, a left rear end portion 4 and a right rear end portion 5. These three end portions 3, 4, 5 form three rounded corner portions. A left side wall 7 extends from the front end portion 3 to the left rear end portion 4, and a right side wall 6 extends from the front end portion 3 to the right rear end portion 5. The left and the right side walls 6, 7 form together a continuous bumper extending from the left rear end portion 4 to the right rear end portion 5 via the front end portion 3. The bumper is a flexible mounted part of the main body 1. Finally, a rear side wall 17 extends from the left rear end portion 4 to the right rear end portion 5.

The bumper cooperates with several sensors 21. The sensors 21 register when bumper is pushed, which occurs when the robotic vacuum cleaner runs into an obstacle. Thus, the bumper and the sensor function as obstacle detecting means.

The main body 1 accommodates a controllable drive means including a steerable drive wheel 2 mounted in the front end portion 3. The drive wheel 2 is rotatable around a wheel shaft 9 and is brought to rotate around the wheel shaft 9 by an electric drive motor 8 for driving the robotic vacuum cleaner. The wheel shaft 9 and the drive motor 8 are fixed to a first ring member 10, which is rotatable mounted on a second, stationary ring member 11. The first ring member 10 is able to rotate around a central vertical axis while gliding on the second stationary ring member 11. The first ring member 10 is provided with an external toothed ring 12. An electric steering motor 13 is connected to the toothed ring 12 for rotating the first ring member 12. Thus, when the steering motor 13 is operated to rotate the first ring member 10, the steerable drive wheel is brought to pivot around a vertical axis, whereby the driving direction is changed and the vacuum cleaner turns.

For powering the electric drive motor 8 and the electric steering motor 13 a set of chargeable batteries 14 is provided in the main body 1.

The robotic vacuum cleaner further includes cleaning means in the form of vacuum means. The vacuum means includes a suction fan 15 sucking dust and debris from a surface to be cleaned through a suction slit 16. The suction slit extends substantially over the whole breadth of the vacuum cleaner at the widest part thereof, i.e. at the rear part. The suction slit 16 is connected to a dustbin 18 by a passage. In the passage at the suction slit 16 a rotatable brush roll 19 is fitted to enhance the dust and debris collecting properties of the vacuum cleaner. The passage with the entrance to the dustbin 18 and the brush roll 19 extends over substantially the whole length of the suction slit 16. Thereby collected dust and debris need not be transported in a sideway direction in the vacuum cleaner and need only be lifted a small height in order to get into the dustbin 18. Thus, the energy needed for collecting dust and debris is kept at a low level. This contributes to the low energy consumption of the vacuum cleaner according to the invention and extends the battery time.

Finally, the vacuum means include a filter 19 protecting the suction fan 15 from any collected dust or debris in the dustbin 18.

A control means in the form of a micro processor 20 is operatively connected to the drive motor 8, the steering motor 13 and the sensors 21.

Figure 6A:
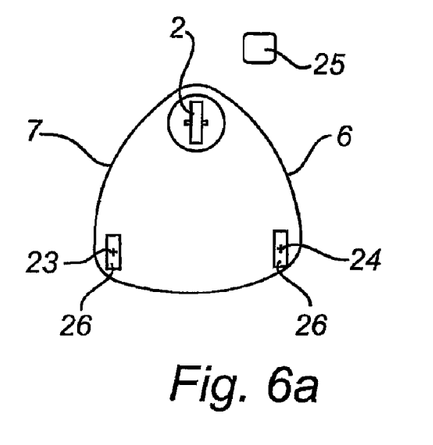
FIGS. 6a-6e is a top view sequence showing the operation of the robotic vacuum cleaner according to the embodiment of the invention when moving to avoid an obstacle which has been detected on the right side.
Figure 6B:
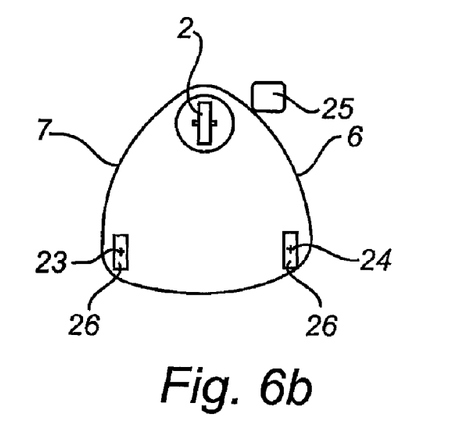
Figure 6C:
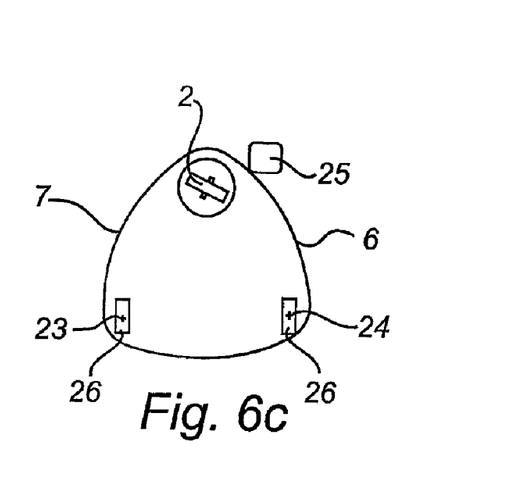
Figure 6D:
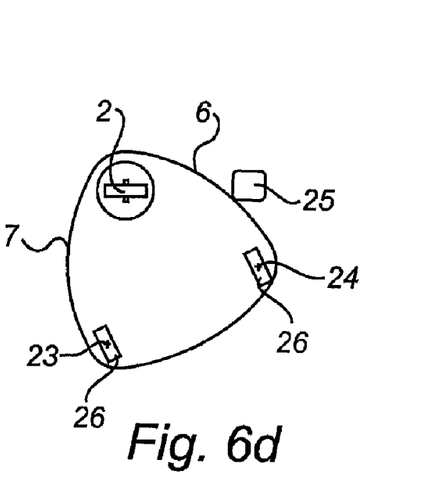
Figure 6E:
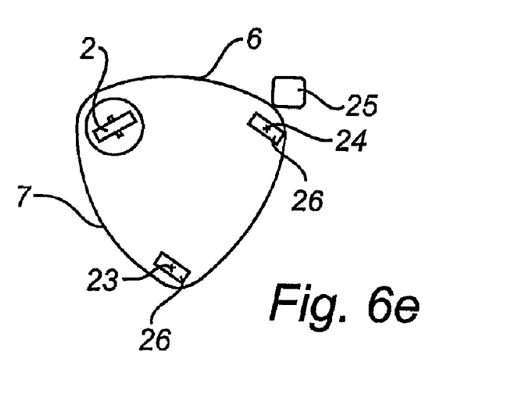
Figure 7A:
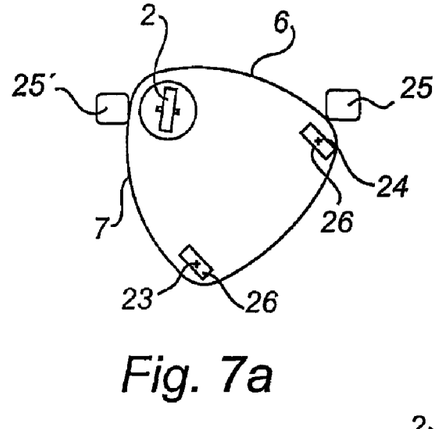
FIGS. 7a-7c is a top view sequence showing the operation of the robotic vacuum cleaner according to the embodiment of the invention when moving to pass between two obstacles which have been detected on the right side and the left side respectively.
Figure 7B:
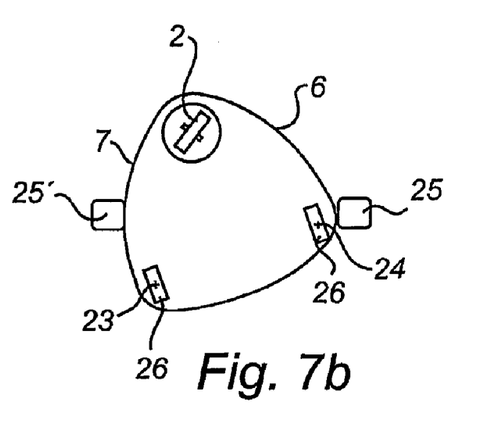
Figure 7C:
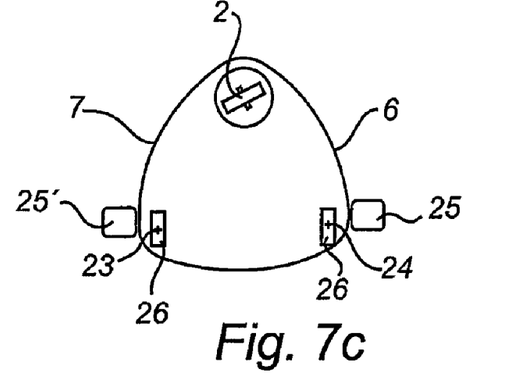
Figure 8:
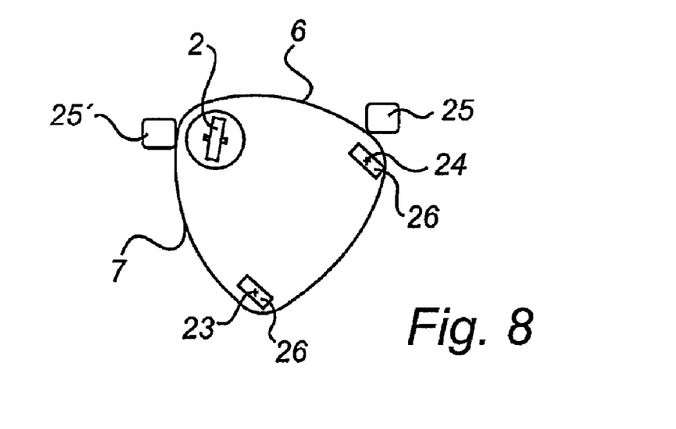
FIG. 8 is top view showing the situation where the robotic vacuum cleaner according to the embodiment of the invention will not fit between two obstacles which have been detected on the right side and on the left side respectively.

Finally, the robotic vacuum cleaner is provided with support means in the form of fixed non-pivotable support wheels 26, cf. FIG. 6-8.

Figure 1:
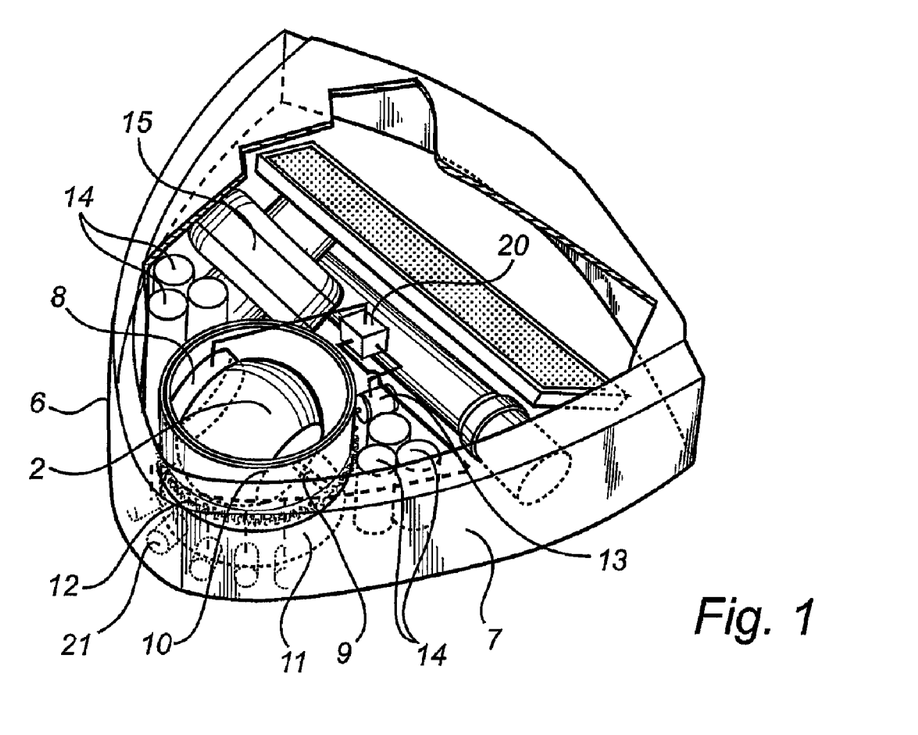
FIG. 1 is a perspective cut-away view of a robotic vacuum cleaner according to an embodiment of the invention.
Figure 2:
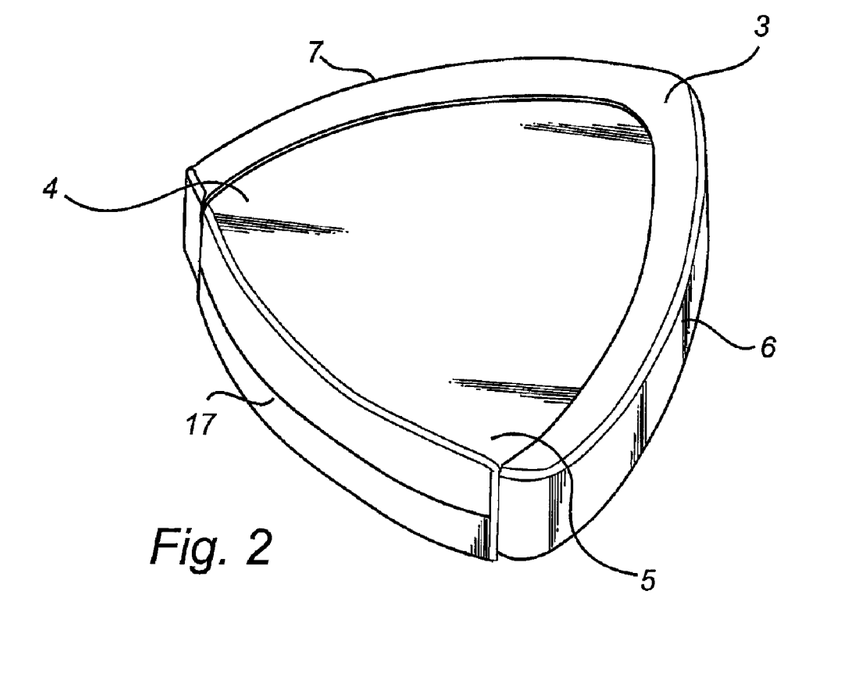
FIG. 2 is a perspective view of the robotic vacuum cleaner according to the embodiment of the invention.
Figure 3:
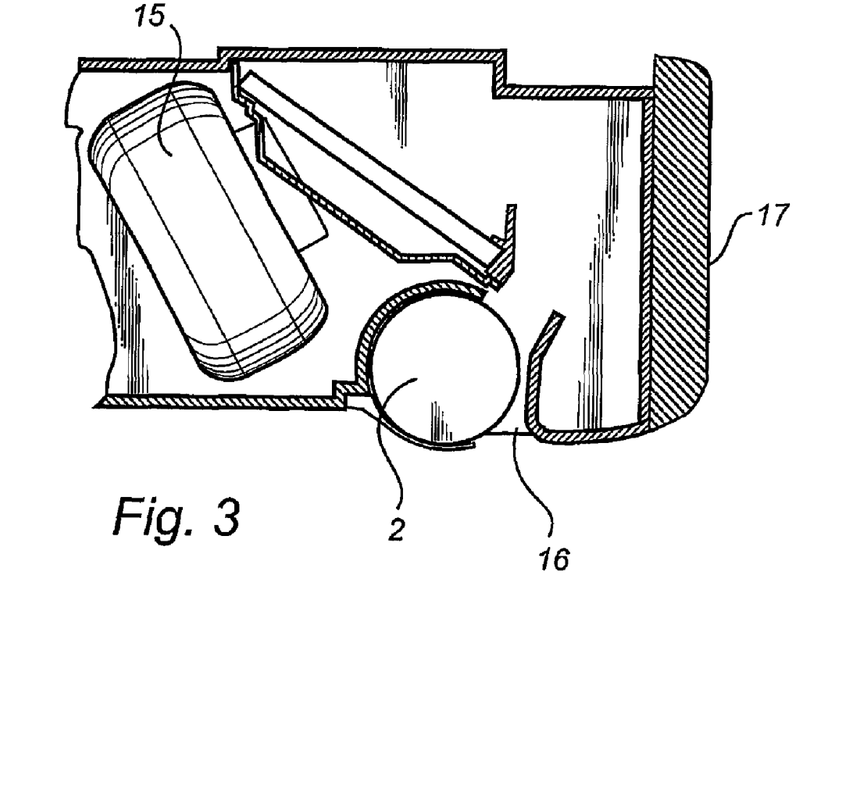
FIG. 3 is a sectional view of the rear half of the robotic vacuum cleaner according to the embodiment of the invention.
Figure 4:
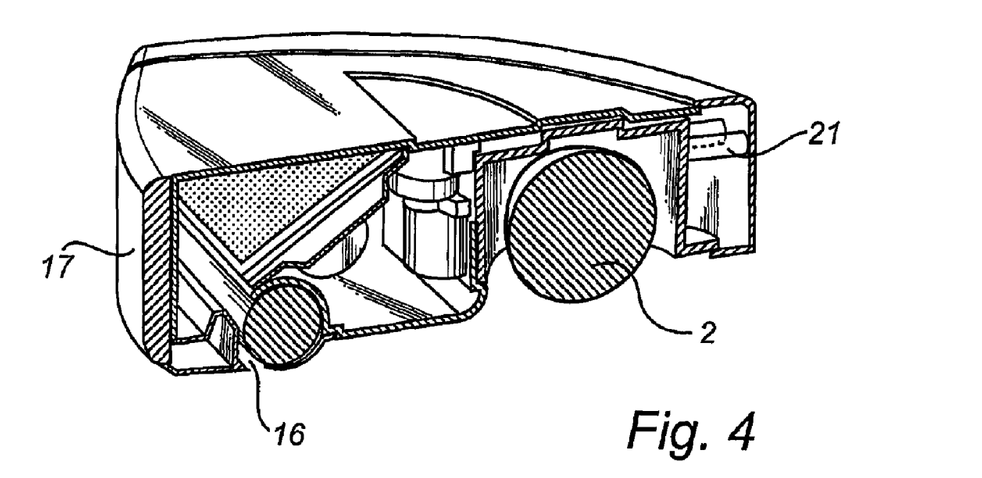
FIG. 4 is a perspective sectional view of the left half of the robotic vacuum cleaner according to the embodiment of the invention.
Figure 5:
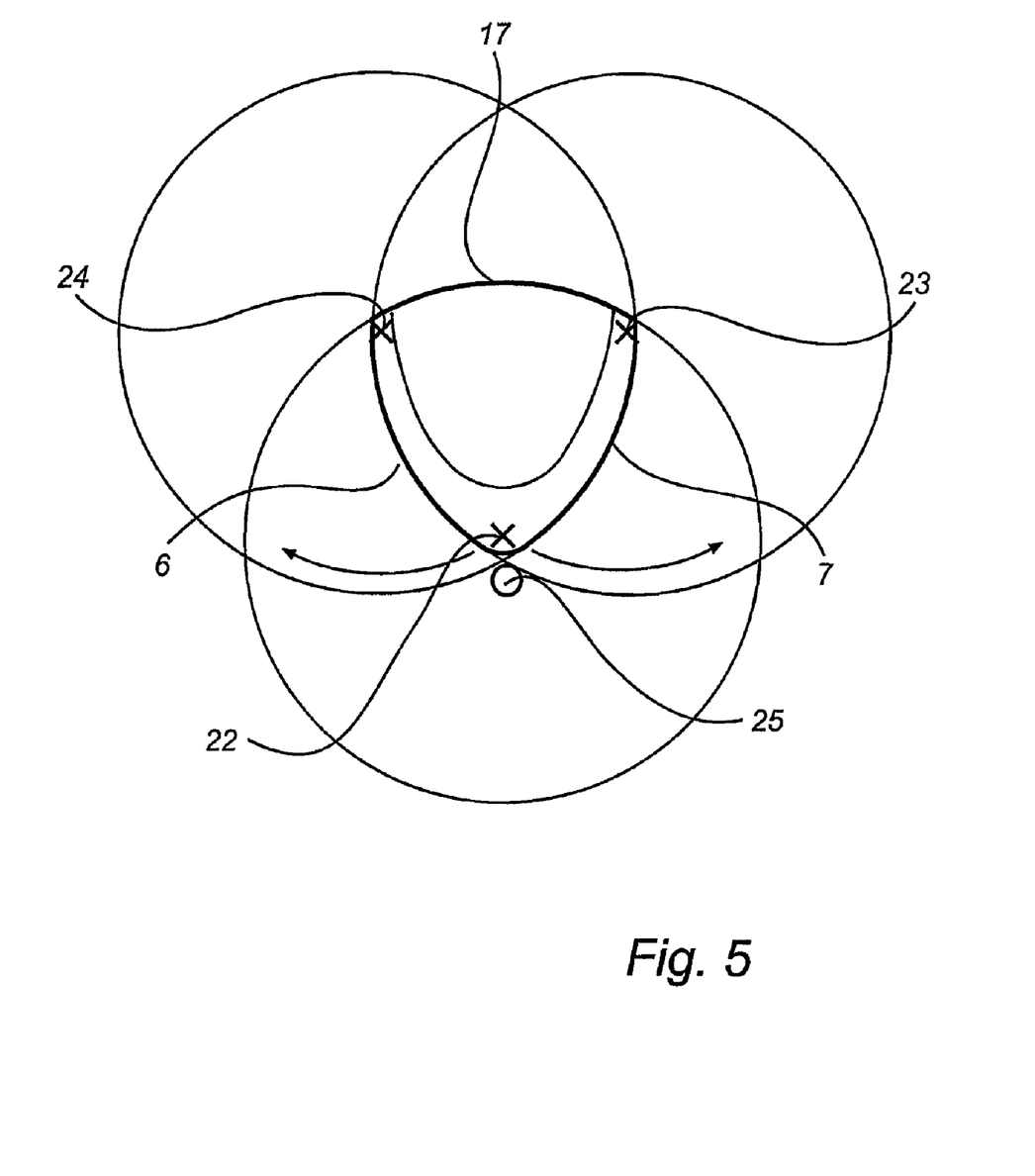
FIG. 5 is a schematic top view of turning circles of the robotic vacuum cleaner according to the embodiment of the invention.

In FIG. 5, the turning properties of the robotic vacuum cleaner according to the invention are illustrated. A main left-turn axis 23 is located in the left rear end portion 4 and a main right-turn axis 24 is located in the right rear end portion 5. The left side wall 7 is shaped as circular arc having a centre of curvature that coincides with the main right-turn axis 23, and the right side wall 6 is shaped as a circular arc having a centre of curvature that coincides with the main left-turn axis 24.

With reference to FIG. 5 in order to avoid an obstacle 25 located straight ahead of the robotic vacuum cleaner, the vacuum cleaner rotates around one of the main turn axis 23, 24. In that, the outline of the side wall will travel along the corresponding circle maintaining a constant distance to the obstacle 25. Consequently, no rear part of the main body 1 will get stuck on the obstacle during turning and the vacuum cleaner will be able to move clear by only the turning motion without sliding.

With reference to FIG. 6-8, the operation of the vacuum cleaner according to the described embodiment of the invention will be described.

In FIG. 6 a sequence illustrating the turning of the robotic vacuum cleaner when encountering an obstacle 25 on the right side is shown. In FIG. 6, the vacuum cleaner is traveling in a straight forward direction. When the detecting means in form of the bumper and the sensors 21 register the hit, the presence of the obstacle 25 on the right side of the main body 1 is communicated to the control means 20. Then control means activates the steering motor 13, which will rotate the first ring member 10 such that the steerable driving wheel is pivoted. Thereby the driving direction of the steerable driving wheel is turned approximately 45° to the left, cf. FIG. 6c. This new driving direction is perpendicular to a line taken from the centre of the drive wheel 2 and the main left-turn axis 23. Consequently, the robotic vacuum. cleaner will begin to turn left around the main left-turn axis 23.

Due to the combination of the circular arc-shaped side wall 6 and the location of the main left-turn axis 23, the vacuum cleaner will move clear from the obstacle by this turning motion only, cf. FIG. 6d. As shown in FIG. 6e, the vacuum cleaner is completely free from the obstacle after having performed a turn of approximately 60°. Thereafter the control means 20 can activate the steering motor 13 to pivot the steerable drive wheel 2 back to the forward driving position or select any other suitable driving direction. During this obstacle avoiding turn, the driving wheel has continuously turned with constant rpm and thus maintained the speed of the vacuum cleaner. Furthermore, due to the concentration of heavy components, such as batteries 14, driving and steering motors 8, 13 and suction fan IS, to the front end of the main body 1, the vacuum cleaner benefits from the momentum forces from these components during the turn around the main left-turn axis 23.

In FIG. 7 a sequence illustrating the turning of the robotic vacuum cleaner when encountering an obstacle 25, 25' on both sides side is shown. If the vacuum cleaner hits a second obstacle 25' on the left side when turning left to avoid a first obstacle on the right side, the control means is activated to turn the drive wheel 2 to rotate approximately 90° from the position in FIG. 6d. Therein, the drive wheel obtains a new driving direction, which is directed approximately 45° to the right of the forward driving direction. This new driving direction is perpendicular to a line taken from the centre of the drive wheel 2 and the main right-turn axis 24. Consequently, the robotic vacuum cleaner will begin to turn right around the main right-turn axis 24.

Due to the combination of the circular arc-shaped side walls 6, 7 with the locations of the main turn axis 23, 24, the vacuum cleaner will move clear from both obstacles 25, 25' by turning motion only, i.e. first a left turn around the main left-turn axis 23 and then a right turn around the main right turn axis 24. Each turn extends over angles of approximately 60°. In FIG. 7c, the vacuum cleaner is shown in a position between the obstacles 25, 25' where the vacuum cleaner is nearly completely free. In this position, the control means 20 can activate the steering motor 13 to pivot the steerable drive wheel 2 back to the forward driving position and the vacuum cleaner will continue the cleaning operation.

Should the distance between two obstacles 25 and 25' be smaller than the breadth of the vacuum cleaner as in the example according to FIG. 8, the right side wall will hit the first obstacle 25 again when the vacuum cleaner starts to turn right around the main right-turn axis in order to turn away from the second obstacle 25'. Thereby the control means 20 will know that the vacuum cleaner can not pass between the obstacles 25 and 25'. In this situation the vacuum cleaner is caught between two too tight obstacles 25, 25', the vacuum cleaner can not move clear by the described turning operations, but will have to reverse and start anew.

The invention claimed is:

1. A robotic cleaning device, comprising:
a main body, which accommodates:
controllable drive means arranged to move the device over a surface,
cleaning means arranged to clean the surface when the device is moved over the surface,
obstacle detecting means, and
a control device connected to the drive means and the obstacle detecting means, wherein
the main body has a left side wall connecting a front end portion with a left rear end portion and a right side wall connecting the front end portion with a right rear end portion,
the control device, when receiving information from the obstacle detecting means about a detected obstacle, is arranged to control the drive means to rotate the device around one of a main left-turn axis located where a left non-pivotable support wheel located at the left rear end portion contacts the surface, and a main right-turn axis located where a right non-pivotable support wheel located at the right rear end portion contacts the surface, such that the device performs substantially only turning motion round the one of said axes, wherein
the left side wall and the right side wall are configured such that the device is moved clear of the detected obstacle by said turning motion; and wherein
wherein at least a major portion of the left side wall is shaped as a circular arc having a first centre of curvature that coincides with the main right-turn axis, and at least a major portion of the right side wall is shaped as a circular arc having a first centre of curvature that coincides with the surface, within a circular arc having a second centre of curvature that coincides with the main left-turn axis, and wherein the maximum distance from the first centre of curvature to the left side wall is located proximal to the front end portion of the main body, and the maximum distance from the second centre of curvature to the right side wall is located proximal to the front end portion of the main body.

2. The robotic cleaning device according to claim 1, wherein the left side wall and the right side wall are substantially isosceles sides having a vertex at the front end portion.

3. The robotic cleaning device according to claim 1, wherein the left side wall and the right side wall are convex.

4. The robotic cleaning device according to claim 3, wherein the main body has a rear side wall connecting the right rear end portion with the left rear end portion, which rear side wall is convex.

5. The robotic cleaning device according to claim 4, wherein at least a major portion of the rear side wall is shaped as a circular arc having a centre of curvature located in the front end portion.

6. The robotic cleaning device according to claim 1, wherein the main body has a general overall shape of a triangular block, preferably an equilateral triangular block.

7. The robotic cleaning device according to claim 1, wherein the drive means includes a steerable drive wheel, and wherein the control means is arranged to control the drive means by steering the steerable drive wheel.

8. The robotic cleaning device according to claim 7, wherein the steerable drive wheel is mounted in front of an axis between the main left-turn axis and the main right-turn axis, preferably at the front end portion.

9. The robotic cleaning device according to claim 8, wherein at least a major portion, preferably more than 80%, of the weight of the device is carried by the steering wheel.

10. The robotic cleaning device according to claim 1, wherein the cleaning means comprises a vacuum device.

11. The robotic cleaning device according to claim 10, wherein the vacuum device includes a suction slit which extends from the left rear end portion to the right rear end portion over substantially the whole breadth of the main body.

12. A robotic cleaning device, comprising:
a body;
controllable drive means connected to the body and arranged to move the device over a surface;
a vacuum fan and motor assembly mounted in the body and fluidly connected to a suction opening located on a lower side of the body to face the surface;
one or more obstacle detecting sensors connected to the body; and
a control system operatively connected to the drive means and the obstacle detecting means; wherein
the control means, when receiving information from the obstacle detecting means about a detected obstacle, is arranged to control the drive means to rotate the device around one of a main left-turn axis located at a left rear end portion of the body and a main right-turn axis located at a right rear end portion of the body, such that the device performs substantially only turning motion round the one of said axes, and
wherein the main body has a left side wall connecting a front end portion with the left rear end portion and a right side wall connecting the front end portion with the right rear end portion, and
wherein at least a major portion of the left side wall is shaped as a circular arc having a centre of curvature that coincides with the main right-turn axis, at least a major portion of the right side wall is shaped as a circular arc having a centre of curvature that coincides with the main left-turn axis, and the left side wall and the right side wall are configured such that the device is moved clear of the detected obstacle by said turning motion;
wherein the drive means includes a steerable drive wheel located at the front end portion of the main body, a left non-pivotable support wheel located in the left rear end portion and a right non-pivotable support wheel located in the right rear end portion, and wherein the control system is arranged to control the drive means by steering the steerable drive wheel
wherein the main left-turn axis is located at a point where the left support wheel contacts the surface, and the main right-turn axis is located at a point where the right support wheel contacts the surface.

13. The robotic cleaning device according to claim 12, wherein the steerable drive wheel is mounted in front of an axis between the main left-turn axis and the main right-turn axis.

14. The robotic cleaning device according to claim 12, wherein at least a major portion of the weight of the device is carried by the steering wheel.

15. The robotic cleaning device according to claim 14, wherein at least 80% of the weight of the device is carried by the steering wheel.

* * * * *